June 29, 1971   J. J. EATON ET AL   3,589,941
FUEL CELL WITH INTERNAL MANIFOLDS
Filed Feb. 24, 1969   5 Sheets-Sheet 1

INVENTORS,
JAMES J. EATON,
DONALD W. TSCHIDA
BY
ATTORNEY

June 29, 1971     J. J. EATON ET AL     3,589,941
FUEL CELL WITH INTERNAL MANIFOLDS
Filed Feb. 24, 1969     5 Sheets-Sheet 1
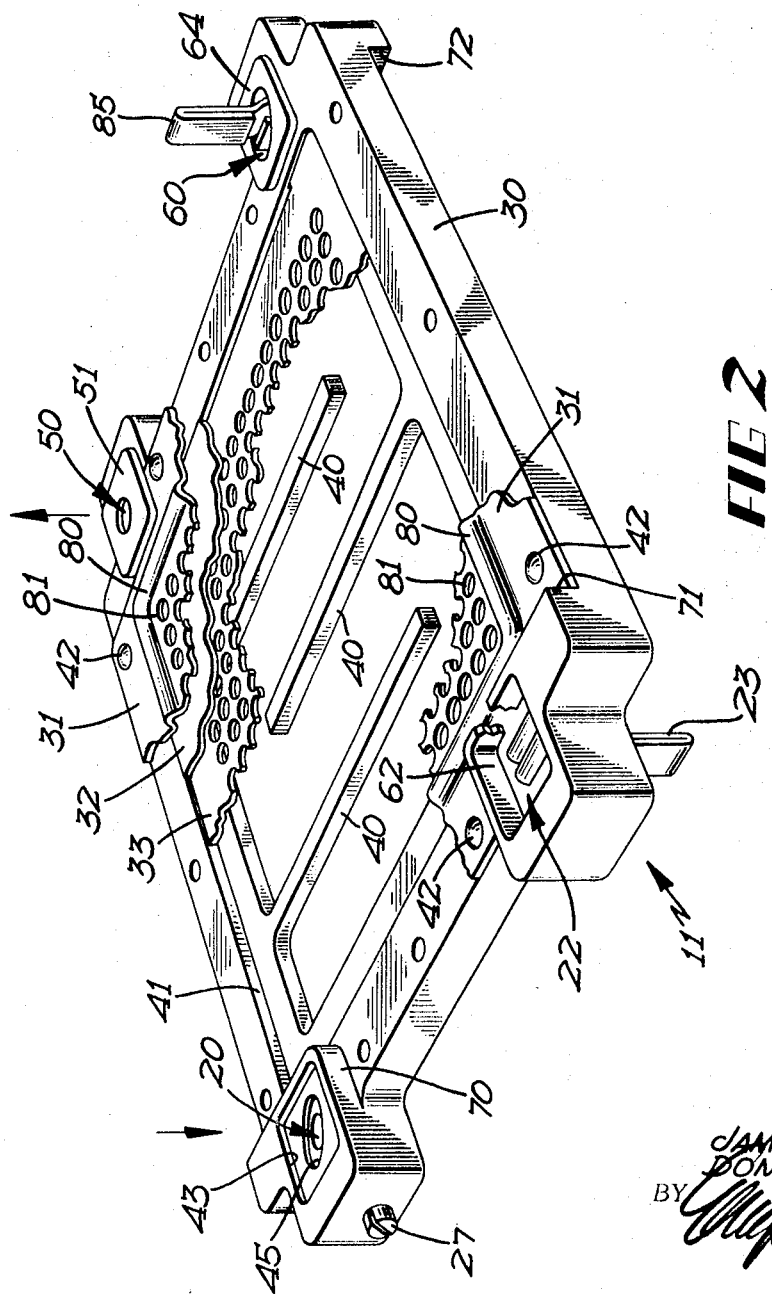
INVENTORS
JAMES J. EATON,
DONALD W. TSCHIDA
BY
ATTORNEY

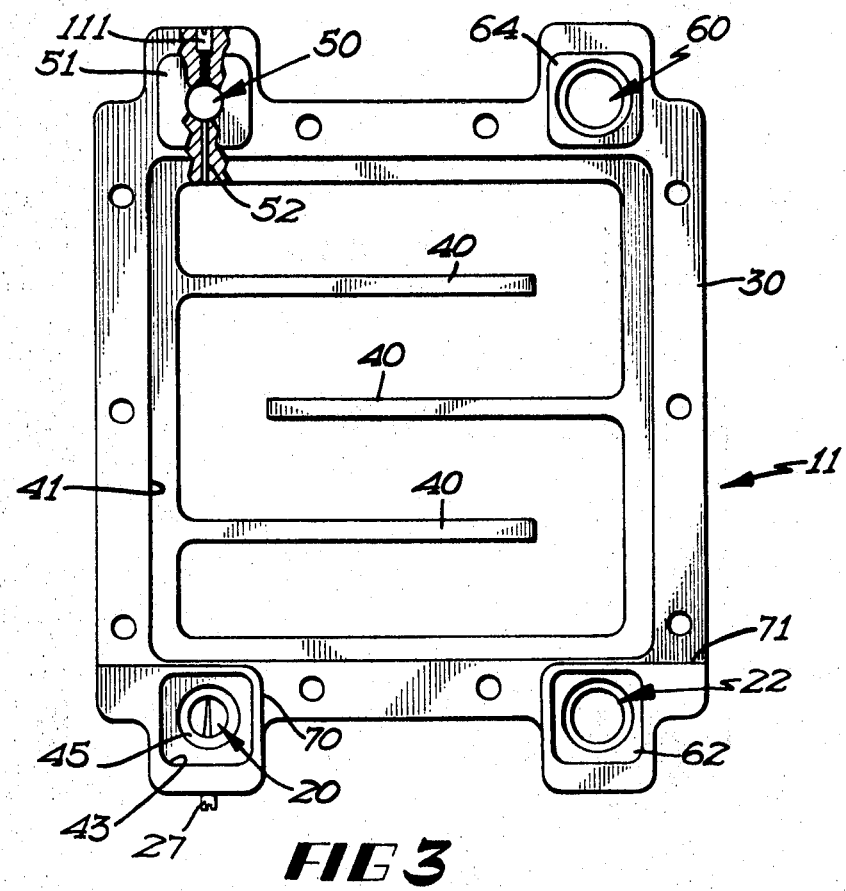
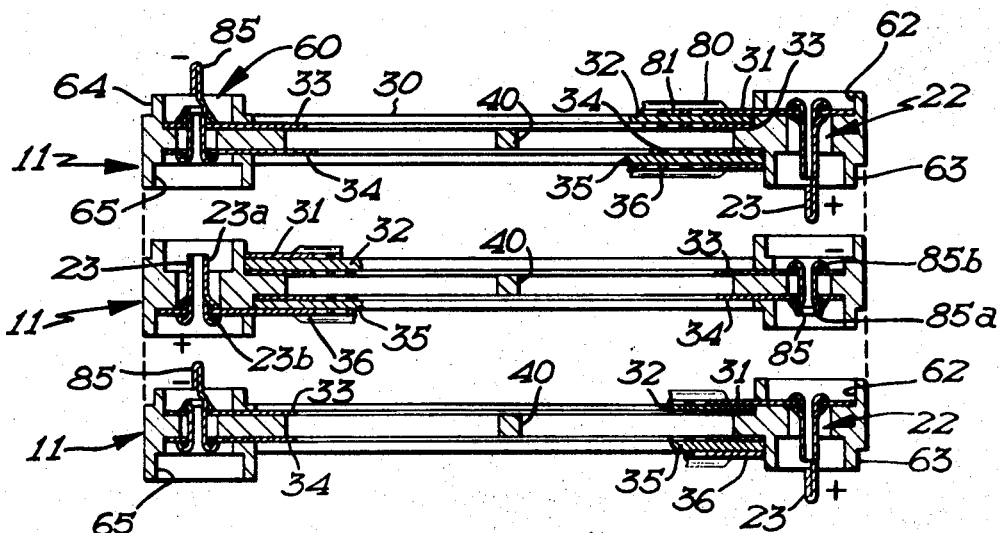

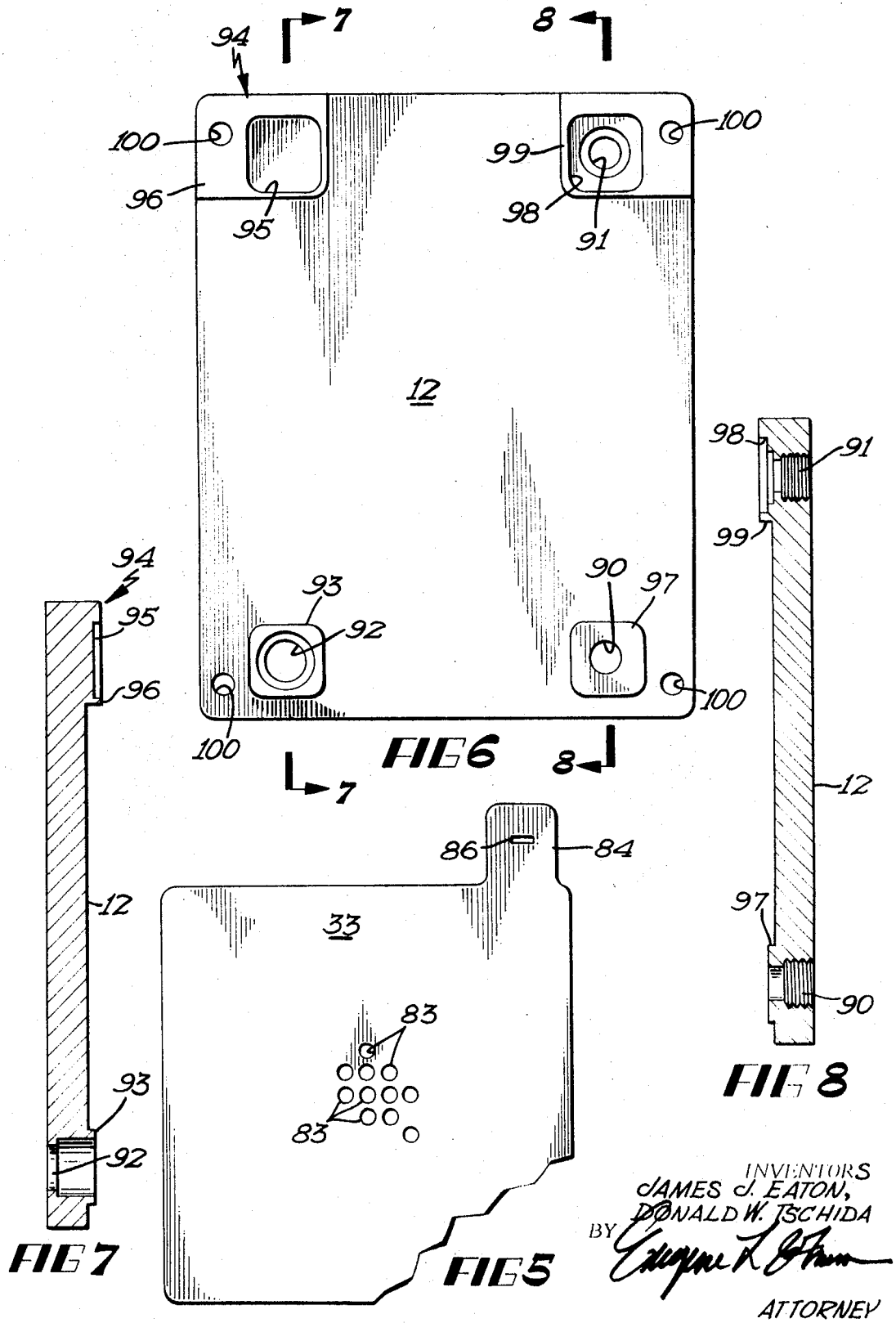

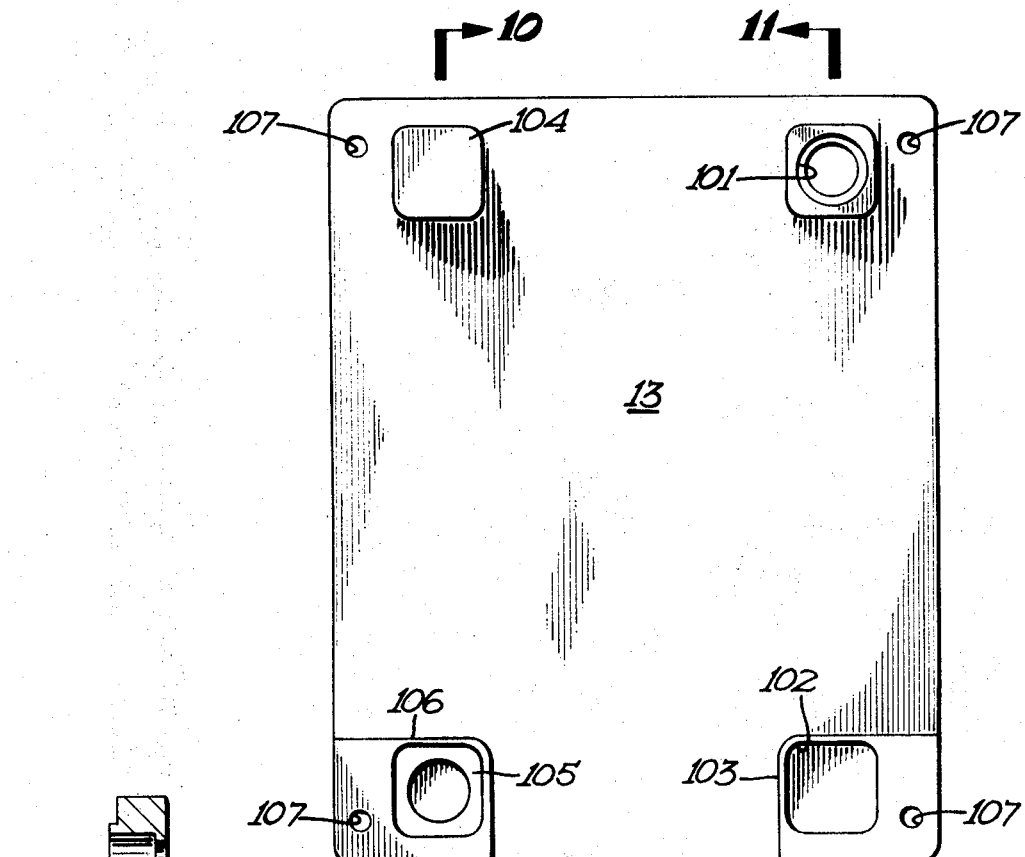
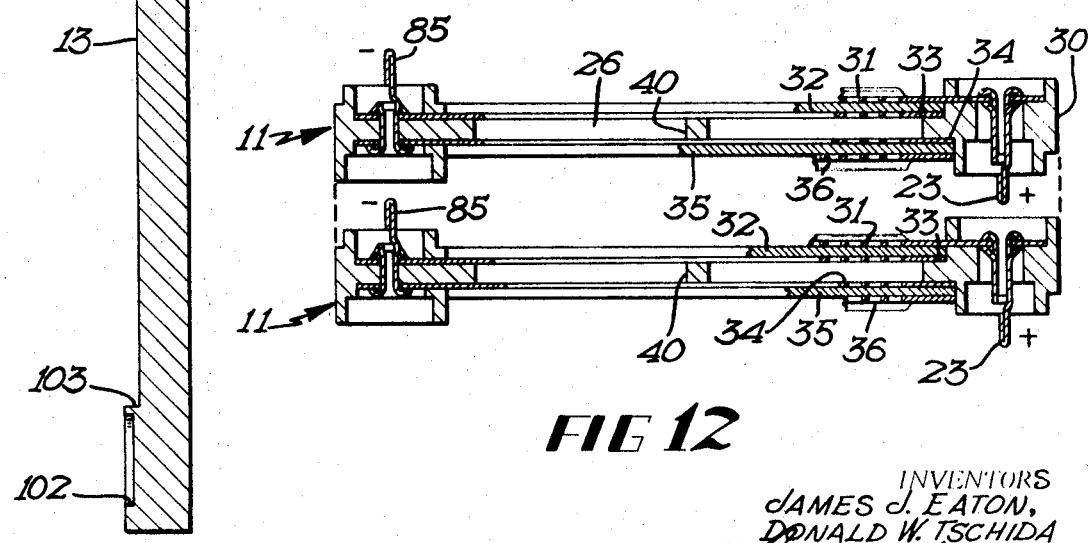

3,589,941
FUEL CELL WITH INTERNAL MANIFOLDS
James J. Eaton, Minneapolis, and Donald W. Tschida,
St. Paul, Minn., assignors to Onan Corporation
Filed Feb. 24, 1969, Ser. No. 801,320
Int. Cl. H01m 27/00
U.S. Cl. 136—86
9 Claims

ABSTRACT OF THE DISCLOSURE

A fuel cell battery consisting of a plurality of associated duplex cells. Each duplex cell is mounted on a single frame which defines an integrally formed fuel input manifold, exhaust manifold, anode terminal manifold, and cathode terminal manifold. Valve means is provided to individually regulate the fuel input to each duplex cell. A plurality of duplex cells may be associated in a highly convenient and efficient manner due to the mating design of the manifolds. Adjacent duplex cells may be electrically connected in series or in parallel with a minimum of adaptation or conversion of individual duplex cells.

BACKGROUND OF THE INVENTION

The invention relates to the field of fuel cell batteries which employ a fluid fuel constituting a first fluid reactant, a second fluid reactant having an oxygen constituent, and an electrolyte. More particularly, it relates to fuel cell batteries of the foregoing type which are further characterized by a duplex cell design. Each duplex cell (consisting of two fuel cells in each duplex cell) includes an internal fuel cavity (between the two individual fuel cells) for the first fluid reactant. Adjacent duplex cells define an external cavity between them for passage of the second fluid reactant, usually air. Such a fuel cell battery is shown and described in a prior application entitled Fuel Cell Designed for Efficient Stacking, Ser. No. 663,110, filed Aug. 24, 1967, and assigned to the assignee of the present invention.

The invention shown and described in the above application (Ser. No. 663,110) has a number of advantages described therein, but lacks an efficient, reliable and convenient means for conducting fuel into and exhaust from the fuel cavity of each duplex cell. It also lacks an efficient and convenient means for electrically connecting the cathode and anode current collectors of the various cells which together form the fuel cell battery. Moreover, this prior art device does not include means for individually regulating the fuel input to each duplex cell.

The present invention solves these problems of the prior art. More particularly, a fuel input manifold and exhaust manifold is integrally formed in the frame of each duplex cell. An anode terminal manifold and a cathode manifold is also integrally formed in the frame of each duplex cell so that when individual cells are associated to form a battery, the fuel input, exhaust, anode terminal, and cathode terminal manifolds are automatically efficiently, conveniently formed. Moreover, means is provided for individually regulating the flow of fuel into each duplex cell. The duplex cells of the present invention are also designed for invertability to allow electrically connecting cathode and anode current collectors either in parallel or in series, whichever may be desired.

SUMMARY

The present invention relates to a fuel cell battery of the type employing a fluid fuel usually having a hydrogen constituent, which constitutes a first fluid reactant, a second fluid reactant having an oxygen constituent, and an electrolyte. The fuel cell battery is formed with a plurality of duplex cells each including a frame, a pair of fuel cells mounted to the frame in spaced relationship to thereby define a fuel cavity between the individual cells, and a fuel input manifold defined by the frame of each duplex cell at its periphery and adapted to mate with the fuel input manifold of adjacent frames. A restricted passage leads from the input manifold to the fuel cavity of each duplex cell. An exhaust manifold is defined by the frame of each duplex cell at a point remote from the input manifold and is adapted to mate with the exhaust manifold of adjacent duplex cell frames. A restricted passage leads from the fuel cavity to the exhaust manifold of each duplex cell. Means is provided for individually regulating the flow of fuel from the input manifold to the fuel cavity in each duplex cell.

The invention also includes an anode terminal manifold and a cathode terminal manifold integrally formed in the frame of each duplex cell to thereby provide automatic, protected, and reliable electrical connections between adjacent duplex cells. An additional feature of the invention is the invertability of adjacent cells so that an electrical connection can be made in either series or parallel.

The primary object of the present invention is to provide a fuel cell battery consisting of a plurality of duplex cells which each have an internally formed fuel input and exhaust manifold adapted to mate with the fuel input and exhaust manifold, respectively, of adjacent duplex cells.

It is also an object to provide a fuel cell battery consisting of a plurality of duplex cells of the form described above in which means is provided to individually regulate the rate of fuel input to each duplex cell.

It is also an object to provide a fuel cell battery as described above which includes an internally formed anode terminal and cathode terminal manifold adapted to mate with anode or cathode terminal manifolds of adjacent duplex cells to provide an automatic, protected and reliable electrical connection between adjacent duplex cells.

The final object of the present invention is to provide an invertable duplex cell design in which alternate duplex cells may be conveniently inverted to allow a series or parallel electrical connections of adjacent duplex cells, whichever may be desired.

FIG. 2 is a perspective view of one duplex cell which, together with similar duplex cells, forms the fuel cell battery of the present invention. In FIG. 2 certain layers are broken away for clarity of illustration.

FIG. 3 is a plan view of the frame of one duplex cell and shows the integrally formed fuel input manifold, exhaust manifold, anode terminal manifold, and cathode terminal manifold. FIG. 3 also shows the spacers in the fuel cavity.

FIG. 5 is a plan view of the anode current collector used in each of the duplex cells.

FIG. 6 is a plan view of the top cover plate of the fuel cell battery which comprises the present invention.

FIG. 7 is a sectional view of the top cover plate taken on line 7—7 of FIG. 6.

FIG. 8 is a sectional view of the top cover plate taken on the line 8—8 of FIG. 6.

FIG. 9 is a plan view of the bottom cover plate of the fuel cell battery which comprises the present invention.

FIG. 10 is a sectional view taken on the line 10—10 of FIG. 9.

FIG. 11 is a sectional view taken on the line 11—11 of FIG. 9.

FIG. 12 is an exploded sectional view of two adjacent duplex fuel cells taken through the anode and cathode terminal manifolds and shows a parallel electrical connection between adjacent duplex cells.

FIG. 13 is an exploded sectional view of three adjacent duplex cells taken through the anode and cathode terminal manifolds and shows the duplex cells connected in series.

DESCRIPTION OF PREFERRED EMBODIMENT

Figure 1:
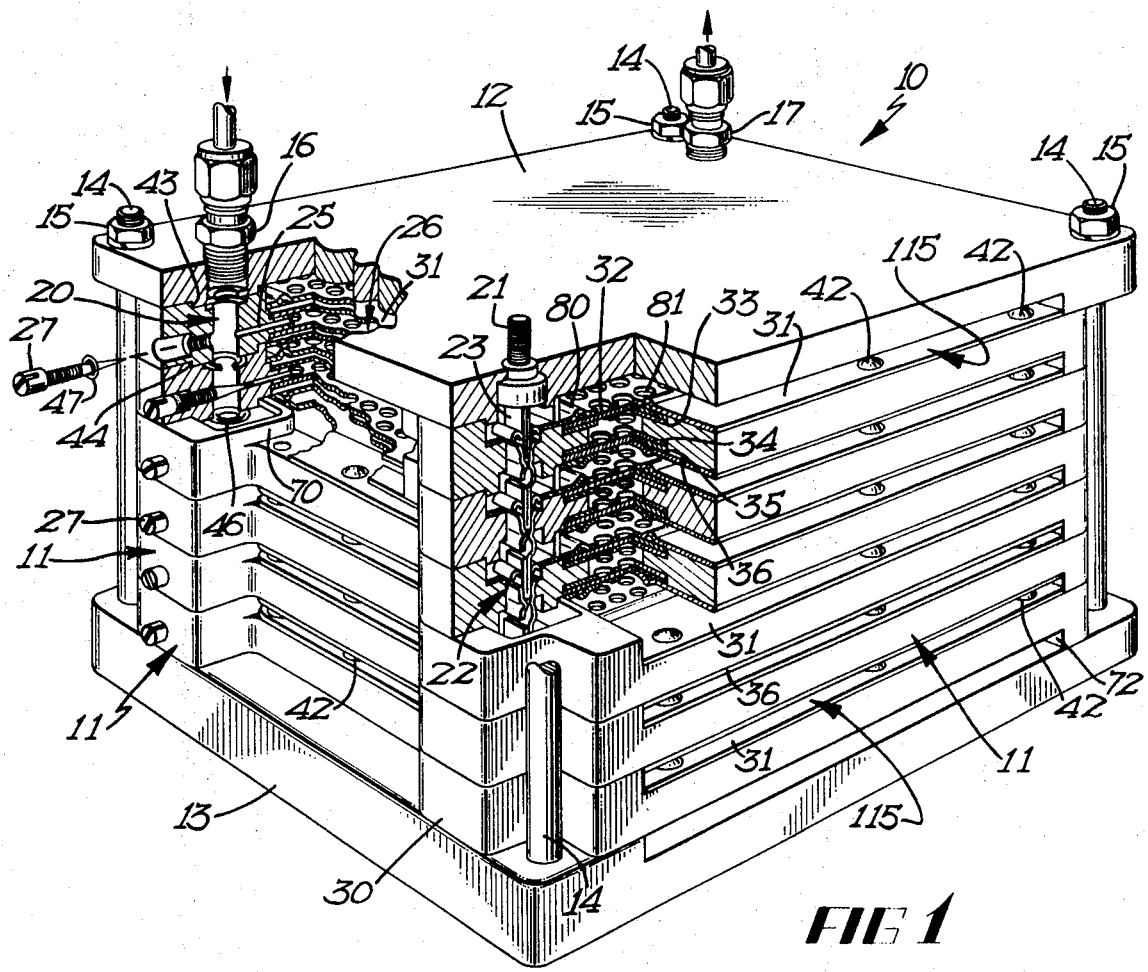
FIG. 1 is a perspective view of the fuel cell battery which comprises the present invention with certain sections broken away for clarity of illustration. The fuel cell battery shown includes six individual duplex cells.

The general nature of the present invention may be readily understood with reference to FIG. 1. The fuel cell 10 is comprised of a number of identical duplex cells 11 which are associated in spaced parallel relationship between top cover plate 12 and bottom cover plate 13. In the fuel cell battery shown in FIG. 1 six duplex cells 11 form fuel cell battery 10. The specific number of duplex cells may, of course, vary considerably. A retaining rod 14, which includes a nut 15 threaded thereto, passes through cover plates 12 and 13 to retain each duplex cell 11 in associated relationship. Fitting 16 is threaded to top cover plate 12 and represents a fuel input fitting. Fitting 17 is also threaded to top cover plate 12 and represents a fuel output fitting. An internal fuel input manifold 20 extends the combined height of the associated duplex cells 11 and communicates with fuel input fitting 16. A similar fuel output manifold (not shown in FIG. 1) communicates with fuel output fitting 17. Both the fuel input manifold 20 and the exhaust manifold (not shown in FIG. 1) communicate with the fuel cavity inside each of the duplex cells 11.

Threaded cathode output terminal 21 is mounted to top cover plate 12 and a similar threaded anode output terminal (not shown) is mounted to bottom cover plate 13. The duplex cells 11, when associated as shown in FIG. 1, form a cathode terminal manifold 22 which extends the combined height of the duplex cells 11 and a similar anode terminal manifold (not shown) is also formed. Cathode electrical connectors 23 serve to electrically connect the cathode plates of each duplex cell 11. Similar anode electrical connectors (not shown in FIG. 1) serve to connect the anode plates of each duplex cell 11. A restricted passage 25 is provided in each duplex cell 11 and communicates from fuel input manifold to fuel cavity 26 in each duplex cell. A needle valve 27 is threaded in the outer wall of fuel input manifold 20 and extends into restricted passage 25 to serve as a means for regulating the flow of fuel into each fuel cavity 26 of each duplex cell 11. A restricted passage is also provided between the fuel cavity and exhaust manifold of each duplex cell 11.

When reference to FIGS. 2 and 12, each of the duplex cells 11 consists of a frame 30; a cathode current collector 31; a wire mesh cathode, an electrolyte containing matrix, and a wire mesh anode, shown schematically and collectively at 32; an anode current collector 33; a fuel cavity 26; a second anode collector 34; a second anode wire mesh, a second electrolyte containing matrix and a second cathode wire mesh, shown collectively at 35; and a second cathode current collector 36.

The general operation of each of the duplex cells 11 may be generally expressed by the following equations. When a fuel having a hydrogen constituent is used, the anode electrolyte interface reaction may be expressed as

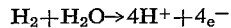

The cathode electrolyte interface reaction may be expressed as follows:

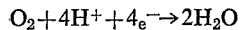

The fluid fuel reactant used in the operation of fuel cell 11 may vary widely, the critical consideration being only that the fluid fuel reacts with oxygen. Impure hydrogen (15% $H_2$ and 85% $N_2$) may be used. Reforming gas (for example, 70% $H_2$, 18.2% CO, 10.5% $CO_2$ and 1.3% $CH_4$) is also a suitable fuel.

The fuel path includes fuel input manifold 20 and restricted passage 25 which leads into fuel cavity 26 of each duplex cell 11. The fuel is thus exposed to the electrolyte-electrode (anode) interface of each of the anode layers of each duplex cell 11.

The oxygen containing reactant, usually air, is caused to flow through the space between adjacent duplex cells 11 to thereby introduce oxygen to the electrolyte-electrode (cathode) interface in each of the cathode component layers of each duplex cell 11. With phosphoric acid as the electrolyte, the operating temperature of the duplex cell should be maintained in the range of 250–350° F. for high current densities. Because of polarization heat produced within the fuel cell when current is being withdrawn, sufficient heat is generated to maintain fuel cell operating temperature. The internal heating effect varies with the amount of current being withdrawn from the cell. To maintain the cell at a temperature of 350° F., as the heating effect of the electro-chemical reaction varies, the flow rate of the input oxygen containing fluid reactant must be varied accordingly.

The detail design and construction of the duplex cell frame may be readily understood with reference to FIGS. 2 and 3. Frame 11 is generally rectangular and includes three fuel cavity dividers and spacers 40 which extend into fuel cavity 26. One fuel cell layer (current collectors, electrodes and matrix) is mounted on each side of fuel cavity 26. In each set of layers, the anode current collectors 33 and 34 and the electrode-electrolyte matrix 32 and 35 are recess mounted in frame 11 at shoulder 41 shown in FIG. 2. The outer current collector, that is, cathode current collectors 31 and 36 extend to the periphery of frame 30 and are rivet mounted by means of rivets 42.

Fuel input manifold 20 is integrally formed at the periphery of each frame 30 and is adapted to mate with the input manifold of adjacent frames. For this purpose fuel input manifold 20 is formed with a female upper surface shown at 43 in FIG. 1 and a male lower surface shown at 44 in FIG. 1. A gasket seat 45 is also formed in the upper surface of fuel input manifold 20 to provide a seat for O-ring 46 to prevent fuel leakage between adjacent duplex cells.

Restricted passage 25 leads from fuel input manifold 20 of each duplex cell 11 to fuel cavity 26. Needle valve 27 is threadably mounted in the outer wall of input manifold 20 and extends into restricted passage 25, as shown in FIG. 1, to serve as means for individually regulating the amount of fuel passing into fuel cavity 26 of each duplex cell 1. An O-ring 47 is associated with needle valve 27 to prevent fuel leakage at the threaded engagement between needle valve 27 and duplex cell frame 30.

Fuel exhaust manifold 50 is similar to fuel input manifold 20 except that the male-female orientation of the design is inverted with respect to input manifold 20. Thus, exhaust manifold 50 is formed with a male portion 51 on its upper surface, as viewed in FIGS. 2 and 3, and a female portion (not shown) on its lower surface. Restricted passage 52, shown in FIG. 3, extends from fuel cavity 26 to exhaust manifold 50. Like fuel input manifold 20, exhaust manifold 50 is integrally formed in frame 30 at the periphery thereof and is adapted to mate with the exhaust manifold of adjacent frames.

Each duplex cell frame 30 also integrally forms an anode terminal manifold 60 and a cathode terminal manifold 22 shown in FIGS. 2 and 3. Like fuel input manifold 20 and exhaust manifold 50 both anode terminal manifold 60 and cathode terminal manifold 22 are adapted to mate with anode or cathode terminal manifolds of adjacent cells. For this purpose cathode terminal manifold 22 is provided with a female upper surface 62 and a male lower surface 63. Similarly anode terminal manifold 60 is provided with a male upper surface 64 and a female lower surface 65. It should be noted that the male-female orientation of anode terminal manifold 60 is inverted with respect to the male-female orientation of cathode terminal manifold 61 of each duplex cell 11.

As best seen in FIG. 2, fuel input manifold 20 is formed with raised side walls 70 and cathode terminal manifold 22 is similarly formed with raised side walls 71. Exhaust manifold 50 is similarly formed with a raised side wall (not shown) and anode terminal manifold 60 is provided with a raised side wall 72. Thus proper spacing between adjacent duplex cells 11 is insured and, moreover, proper spacing is insured when one duplex cell 11 is inverted with respect to an adjacent duplex cell due to the invertibility of duplex cells 11.

Figure 4:
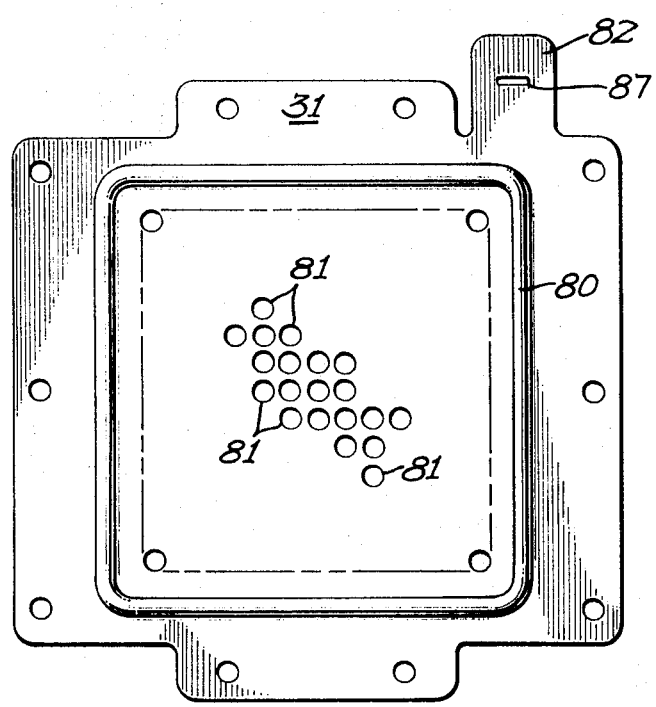
FIG. 4 is a plan view of a cathode current collector used in each of the duplex cells.

The detailed design of cathode current collectors 31 of each duplex cell 11 is shown in FIG. 4. Cathode current collector 31 is preferably formed of tantalum with a thickness of 0.030 inch, although both the composition and thickness may vary. Rib 80 surrounds the series of holes or openings 81 in the interior of cathode current collector 31. While the size and number of openings may vary 15 rows of 15 openings each with a diameter of 0.125 inch is preferred. Cathode current collector 31 is formed with a cathode terminal connecting tab 82 which extends into cathode terminal manifold 22 of each duplex cell 11. To accommodate tab 82 the interior raised side wall 71, best seen in FIGS. 2 and 12 is undercut on two sides. Thus tab 82 is given access to and extends into cathode terminal manifold 22.

Cathode current collectors 36, shown in section in FIGS. 12 and 13, are similar in design to cathode current collectors 31 except they do not include tab 82 and do not extend into cathode terminal manifold 22. There is no need to make an electrical connection with cathode current collectors 36 and cathode terminals 23 in the area of cathode terminal manifold 22 of each duplex cell 11 because an electrical connection is made between cathode current colectors 31 and 36 by rivets 42.

Anode current collectors 33 and 34 are shown in detail in FIG. 5 and consist of a perforated tantulum plate 0.015 inch in thickness although the composition, thickness, and size and number of openings may vary. Openings 83 of anode current collectors 33 and 34, like openings 82 in cathode current collectors 31 and 36 are preferably 0.125 inch in diameter, in 15 rows of 15 holes each, and located on 0.187 inch centers. Anode current collectors 33 and 34 are formed with anode terminal connecting tab 84 which extends into anode terminal manifold 60. As best seen in FIG. 12 both the male and female interior wall of anode terminal manifold 60 of each duplex cell 11 is undercut to accommodate tab 84.

Anode terminal 85 is crimped onto tabs 84 of both anode current collectors 33 and 34 as best seen in FIG. 12. For that purpose, tabs 84 extend into anode terminal manifold 60, and anode terminal 85 extends through the opening 86 in tab 84 and is crimped thereto. It should be noted that one end of anode terminal 85 serves as a plug and the other end sevres as a jack to provide for mating of adjacent terminals.

Cathode terminal 23 is crimped to tab 82 through opening 87 as shown in FIG. 12. Cathode terminal 23 is crimped only to cathode current collector 31 and is not crimped to the opposite cathode current collector 36 of duplex cell 11, since, as pointed out above, an electrical connection is made between cathode current collectors 31 and 36 by rivets 42. Like anode terminals 85, cathode terminals 23 are formed with a plug and jack end to facilitate mating with terminals of adjacent duplex cells 11.

It should be noted that male and female portions 62, 63, 64 and 65 of cathode terminal manifold 22 and anode terminal manifold 60, respectively, mate with corresponding parts of adjacent duplex cells 11 when cathode terminals 85 and anode terminals 23 are electrically connected or mated.

The detailed construction of top cover plate 12 may be best understood with reference to FIGS. 6, 7 and 8. Top cover plate 12 is provided with three openings including fuel input manifold opening 90, exhaust manifold opening 91 and cathode terminal manifold opening 92. With reference to FIG. 7, cathode terminal manifold opening 92 is provided with a male wall shown at 93. The anode terminal manifold portion 94 of top cover plate 12, includes no opening but does include a female portion 95 set in raised portion 96 of top cover plate 12. With reference to FIG. 8, fuel input manifold opening 90 is threaded for mounting fuel input fitting 16 thereto and is provided with a male portion 97 for mating with corresponding female portions of the fuel input manifold 20 of the exterior or outermost duplex cell 11 in battery 10. Exhaust manifold opening 91 is also threaded for engagement by exhaust fitting 17 and includes a female portion 98 with raised walls 99. Openings 100 are provided at each corner of top cover plate 12 to accept retaining rods 14 therein.

It should be noted that top cover plate 12 mates with the outermost duplex cell 11 of fuel cell battery 10 no matter which side of the duplex cell 11 is in contact with top cover plate 12. In other words, due to its unique design, top cover plate 12 accommodates the invertibility of duplex cells 11.

Bottom cover plate 13 is shown in detail in FIGS. 9, 10, and 11. It is similar in design to top cover plate 12 but includes only one opening, namely, anode terminal manifold opening 101 shown in FIG. 11. Bottom cover plate 13 serves to plug cathode terminal manifold 22 at female portion 102 which includes raised side walls 103 shown in FIG. 11. Bottom cover plate 13 also plugs exhaust manifold 50 at male plug 104 shown in FIG. 10 and it also plugs fuel input manifold 20 at female plug 105 which includes raised side walls 106. Like top cover plate 12, bottom cover plate 13 is provided with an opening 107 at each corner to accept retaining rod 14. In addition, like top cover plate 12, bottom cover plate 13 is designed to accommodate the invertibility of the duplex cell 11 in contact with it.

The individual duplex cells 11 may be associated in parallel, as shown in the exploded view of FIG. 12, or in series as shown in the exploded view of FIG. 13.

With reference to FIG. 12, when adjacent duplex cells 11 are connected in parallel, the plug end of cathode terminal 23 seats in the jack end of the adjacent cathode terminal 23 and anode terminal 85 contacts the adjacent anode terminal 85 in a similar manner. With anode terminals 85 and cathode terminals 23 electrically connected, the male portion 64 of anode terminal manifold 60 mates with the female portion 65 of the anode terminal manifold of the adjacent duplex cell 11. Similarly, the male portion 63 of cathode terminal manifold 22 mates with the female portion 62 of the cathode terminal manifold 22 of the adjacent duplex cell 11. Thus electrical connection is made in a hidden and protected environment inside anode terminal manifold 85 and cathode terminal manifold 22.

Alternate duplex cells 11 of fuel cell battery 10 may be inverted to result in series connected duplex cells 11 as shown in FIG. 13. The invertibility of cathode terminal manifold 22 and anode terminal manifold 60 referred to above makes a series connection highly convenient with one minor change in the configuration of cathode terminal 23 and anode terminal 85 in every other duplex cell 11. This minor change involves "snipping" off the plug portion of both cathode terminal 23 and anode terminal 85 in alternate duplex cells 11 so that there is no electrical connection at the plug end of the respective electrical terminals. The interior duplex cell 11 of FIG. 13 is shown with this step accomplished. Thus there is no electrical connection at the removed plug end 85a of anode terminal 85 or plug end 23a of cathode terminal 23. There is, of course, an electrical connection at the jack end 85b of anode terminal 85 and 23b of cathode terminal 23 with the adjacent respective cathode and anode terminals. Thus, with one easily accomplished conversion step, the duplex cells 11 of fuel cell battery 10 may be series connected.

It should be pointed out that exhaust manifold 50 is provided with a threaded needle valve opening 110 shown in FIG. 3 which takes on importance when the duplex cells 11 are series connected as shown in FIG. 13. When parallel connected, exhaust manifold 50 is plugged with plug 111 as shown in FIG. 3, but when the fuel cell is inverted for series connection, exhaust manifold 50 becomes part of the fuel input manifold and vice versa. Consequently, needle valve 27 and plug 111 are interchanged to provide a means for regulating the fuel input through passage 52 which, when the inversion is accomplished, becomes a fuel input passage rather than a fuel exhaust passage.

No change need be made in top cover plate 12 or bottom cover plate 13 in the conversion from parallel to series connection of adjacent duplex cells due to the invertible design of both top cover plate 12 and bottom cover plate 13 described previously.

Due to the raised side walls 70, 71 and 72 of fuel input manifold 20, cathode terminal manifold 22 and anode terminal manifold 60, respectively, and the raised side wall portion (not shown) of exhaust manifold 50, spacing between adjacent duplex cells 11 is automatic. Thus cavities 115, shown in FIG. 1, are formed between adjacent duplex cells 11 and between the outermost duplex cells 11 and top and bottom cover plates 12 and 13, respectively.

The operation of fuel cell battery 10 which comprises the present invention has been described generally above. Certain more detailed elements of operation should be noted. Duplex cells 11 are associated in fuel cell battery 10 as shown in FIG. 1 with each of the four manifolds in mated relationship and with retaining rods 14 passing through top cover plate 12 and bottom cover plate 13 to maintain the individual duplex cells 11 in their associated relationship. Fuel is introduced into fuel input manifold 20 through fuel input fitting 16. The passage of fuel may be regulated in fuel cavity 26 of each duplex cell 11 by adjusting needle valve 27. Fuel thus introduced circulates through passage 25 around dividers and spacers 40 and out of fuel cavity 26 through passage 52 and exhaust manifold 50. Needle valves 27 may be adjusted to eliminate internal charging in fuel cell battery 10.

Fuel cell battery 10 may be operated in duplex cells 11 electrically connected in parallel, as shown in FIG. 1 and FIG. 12, in series as shown in FIG. 13. To convert from parallel to series operation, nuts 15 are removed from retaining rods 14 and individual duplex cells 11 are removed from associated relationship with adjacent cells. The plug end of cathode terminal 23 and anode terminal 85 is removed in alternating duplex cells 11. The alternating duplex cells are inverted and put back into associated or mated relationship with adjacent duplex cells, as shown in FIG. 13. Retaining rods 14 are secured and conversion is complete.

The unitized duplex design of duplex cells 11 also facilitates removal of a defective cell. For that purpose nuts 15 may be removed and the fuel cell battery 10 may be taken apart at the defective cell, the defective cell may be removed, and the fuel cell battery can be put back together after a new cell is substituted or merely with the defective cell removed.

The foregoing invention thus provides a fuel cell battery in which fuel input and exhaust is conducted into and out of individual cells through internally formed manifolds. Electrical connections are also made automatically in internal manifolds. Means is provided for individually adjusting the fuel input to each duplex cell to thereby eliminate internal charging. The invention described also provides a highly convenient and efficient method for converting from parallel to series connection of electrical terminals of the duplex cells which together comprise the fuel cell battery.

It is clear that the invention may be embodied in other forms without departing from the spirit or central characteristics thereof. The present embodiment is thus to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described the present invention, we claim:

1. A fuel cell battery of the type employing a fluid fuel constituting a first fluid reactant, a second fluid reactant having an oxygen constituent and an electrolyte;
   a plurality of duplex cells each comprising:
   a frame;
   a pair of fuel cells mounted to said frame in spaced relationship to thereby define a fuel cavity between said cells;
   an input manifold defined by said frame at the periphery thereof and adapted to mate with the input manifold of adjacent frames;
   a restricted passage defined by said frame between said input manifold and said fuel cavity;
   an exhaust manifold defined by said frame at the periphery thereof at a point remote from said input manifold, and adapted to mate with the exhaust manifold of adjacent frames;
   a restricted passage defined by said frame between said fuel cavity and said exhaust manifold;
   valve means mounted in said frame for regulating the flow of fuel in said restricted passage between said input manifold and said fuel cavity;
   an anode terminal manifold defined by said frame and adapted to mate with the terminal manifold of adjacent frames;
   an anode terminal in said anode terminal manifold;
   a cathode terminal manifold defined by said frame and adapted to mate with the terminal manifold of adjacent frames; and
   a cathode terminal in said cathode terminal manifold.

2. The fuel cell battery of claim 1 wherein said input manifold and said exhaust manifold are adapted to mate with input and exhaust manifolds of adjacent frames without regard to orientation of said frame and wherein said anode terminal manifold and said cathode terminal manifold are adapted to mate with node and cathode terminals of adjacent frames without regard to orientation of said frame.

3. The fuel cell battery of claim 1 wherein said valve means for regulating the flow of fuel in said restricted passage between said input manifold and said fuel cavity comprises a needle valve mounted in a wall of said input manifold and extending into said restricted passage.

4. The fuel cell battery of claim 1 and valve means mounted in said frame for regulating the flow of fluid in said restricted passage between said fuel cavity and said exhaust manifold.

5. The fuel cell battery of claim 1 wherein said battery is electrically connected for series operation.

6. The fuel cell battery of claim 3 and valve means for regulating the flow of fluid in said restricted passage between said fuel cavity and said exhaust manifold comprising a needle valve.

7. The fuel cell battery of claim 4 wherein said input manifold and said exhaust manifold are adapted to mate with input and exhaust manifolds of adjacent frames without regard to orientation of said frame and wherein said anode terminal manifold and said cathode terminal manifold are adapted to mate with anode and cathode terminals of adjacent frames without regard to orientation of said frame.

8. The fuel cell battery of claim 5 wherein said battery may be converted to parallel operation by inverting alternate duplex cells.

9. The fuel cell battery of claim 8 and valve means for regulating the flow of fluid in said restricted passage between said fuel cavity and said exhaust manifold.

References Cited

UNITED STATES PATENTS

| 1,359,881 | 11/1920 | Emanuel | 136—86 |
| 3,453,147 | 7/1969 | Griffin | 136—86 |

WINSTON A. DOUGLAS, Primary Examiner

H. A. FEELEY, Assistant Examiner